Aug. 7, 1951 | L. W. PARKER | 2,562,941

SWEEP GENERATOR

Filed March 20, 1946

INVENTOR.
LOUIS W. PARKER

BY

R P Morris
ATTORNEY

Patented Aug. 7, 1951 2,562,941

UNITED STATES PATENT OFFICE 2,562,941

SWEEP GENERATOR

Louis W. Parker, Jackson Heights, N. Y., assignor to Federal Telephone and Radio Corporation, New York, N. Y., a corporation of Delaware Application March 20, 1946, Serial No. 655,791

3 Claims. (Cl. 250—36)

Figure 1:
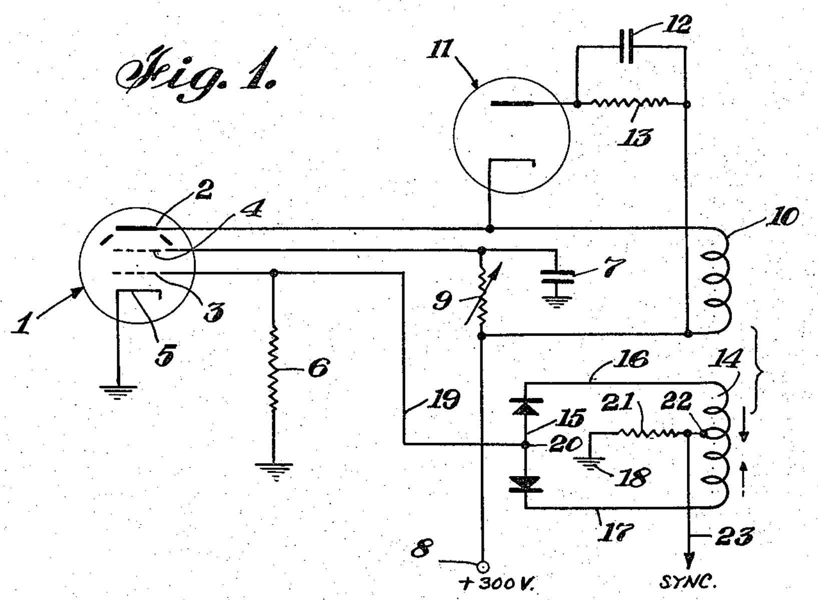

This invention relates to coil circuits and to saw-tooth wave generating devices used to excite them and more particularly for use in cathode ray tube deflection circuits.

It is customary to employ magnetic deflection circuits for cathode ray tubes which operate on the basis that a desired saw-tooth current wave is generated and is applied across the deflection coils or the yoke through an amplifier and output transformer. Both the amplifier and output transformer are prone to distort the applied voltage wave, the deflection thereby ceasing to be linear. In my prior application Ser. No. 649,062 filed February 20, 1946, now U. S. Patent No. 2,521,741. I have disclosed a method and apparatus for maintaining linearity under such circumstances. Therein I described a form of negative feed-back from a pick-up coil located in the deflection coil field to a control electrode of the power amplifier feeding such deflection coil with current waves of saw-tooth shape. Such feed-back was arranged to oppose any change in the constancy in the use of the magnetic field of the deflection coil. This property of the circuit therein disclosed I utilize in my present invention. The means used in the prior application has itself, however, been modified in a manner to effect further the objects of my present invention.

It is an object of the present invention to provide a further deflection circuit of the type referred to which substantially compensates for the inherent non-linearity of the circuit.

It is a further object of my invention to provide a generating means for producing a wave for magnetic deflection circuits having means for stabilizing the linearity of sweep current increase and means cooperating with said stabilizing means to effect reversal of the sweep.

A still further object is to provide in a stabilizing means of the type referred to a feed-back circuit of one polarity for establishing linearity control and a means for reversing the polarity of feed-back to cause cessation of the stabilizing operation and effect relatively abrupt change in linearity, and thereby terminating the sweep and producing a reversal thereof.

It is also an object of this invention to provide a deflection circuit which contains fewer components than heretofore believed necessary.

It is another object of this invention to control the characteristics of such deflection circuits by the introduction of an automatic controlling voltage in accordance with necessity which either retards or accelerates deviations from given rates of change in the deflection voltage.

It is a still further object to eliminate the need for frequency control in a circuit of the type referred to.

In accordance with the invention I provide a self-oscillating saw-tooth type deflection voltage generator the output of which is directly applied to the deflection coils of a cathode ray oscilloscope. Closely coupled to the deflection coils, I provide a pick-up coil which has the function of providing a correcting voltage to be fed-back to one of the grids of the saw-tooth generator in accordance with the rate of change of the magnetic field of the deflection coil. The pick-up or feed-back coil which is connected to the control grid of the sweep voltage generator over a two-way rectifier has also applied thereto a synchronizing pulse which is fed to the control grid to initiate a reversal in the feed-back voltage and cause a shutting off of the plate current in the sweep generator. In effect, the present circuit has the purpose of retarding any change in the rate of increase in the plate current of the sweep generator and of accelerating the decrease thereof whenever such a decrease is initiated by an outside source.

Figure 2:
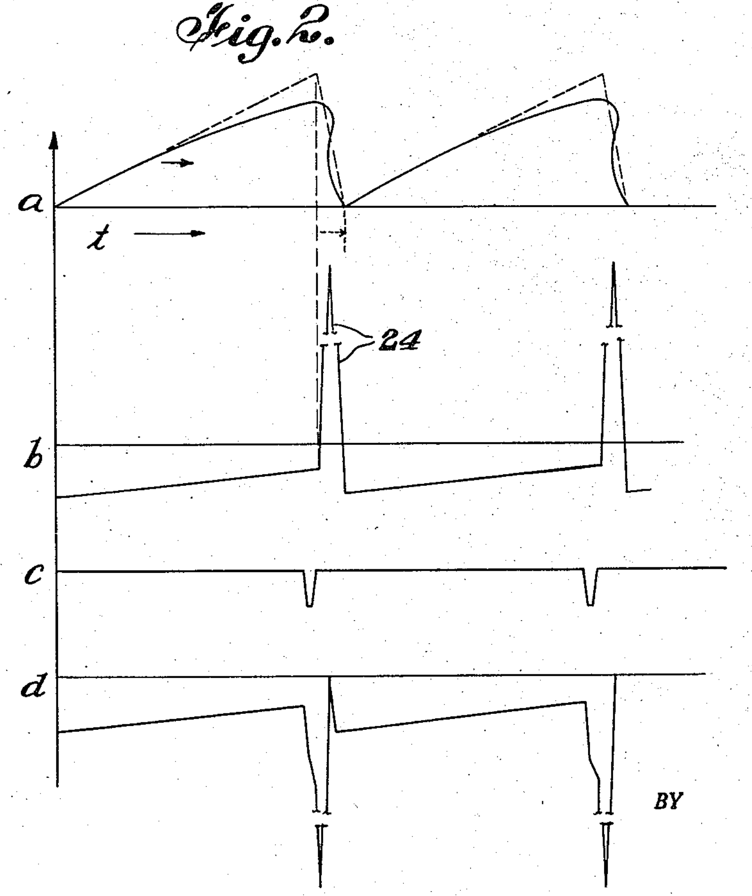

A better understanding of my invention and the objects and features thereof may be had from a particular description of an embodiment thereof made with reference to the accompanying drawings, in which:

Fig. 1 is a representation in schematic form of a circuit diagram showing a deflection circuit incorporating my invention; and Fig. 2 is a representation in graph form of certain operating conditions of the circuit of Fig. 1.

Referring to the circuit diagram, a sweep voltage generator is illustrated comprising an oscillator 1 which consists of a multi-grid tube such as a tetrode having a plate 2, a control grid 3, screen grid 4 and a cathode 5. The cathode 5, control grid 3 and the screen grid 4 are all connected to ground, the control grid over a grid resistance 6 and the screen grid over a by-pass or voltage stabilizing condenser 7. The screen grid also receives a biasing potential from a voltage source at 8 over an adjustable dropping resistance 9. A coil as indicated at 10 for producing a magnetic deflection field which may be shaped in the form of a yoke is connected across the oscillator circuit to receive a saw-tooth type deflection voltage therefrom, connections being made to the plate and to the high potential side of the screen grid dropping resistance 9. In order to prevent or to dampen oscillations in the circuit including the deflection coil 10, a voltage responsive short-circuiting circuit has been provided across the coil in the form of a diode rectifier 11 which in its plate circuit has a time constant device comprised of a condenser 12 and a resistance 13. Closely coupled to the deflection coil 10 a pick-up or feed-back coil 14 has been provided preferably located on the yoke for close coupling therewith. The output of the coil 14 is obtainable from either end thereof over a two-way rectifier 15 which is connected to the ends 16 and 17 of the coil 14 respectively to provide a path for the output voltage thereof with respect to ground at 18 over a connection 19 to the control grid 3 from a midpoint 20 of the rectifier 15. The coil 14 is connected to ground 18 over a resistance 21 from a point 22 thereof chosen in accordance with a desired distribution of voltages of the two coil portions thus formed to correspond with the controls which the respective coil portions are desired to exert in respect to certain portions of the deflection voltage cycle. The coil 14 is also the recipient of a synchronizing pulse at the point 22 over a connection 23 from an outside source of pulses.

In analyzing the operation of the circuit just described reference is had to the graphs of Fig. 2. If it is assumed that the cathode 5 of the oscillator 1 has been heated and the plate and screen potentials have been applied, the current through the yoke 10 will tend to rise with time as represented in graph *a*. However, the voltage generated across the pick-up coil 14, as shown in graph *b*, puts a negative potential on the control grid 3 of the tube 1 keeping the said current rise to a comparatively slow rate. As the cycle progresses there will be a slow drop in the rate of rise of the plate current and consequently in that of the negative voltage at the grid (graph *b*) due to the inherent non-linearity of the circuit. This change in rate may be made negligible by increasing the number of turns in the feed-back coil. If, after the plate current has attained a desired value, a negative pulse is applied to the control grid in the form of an outside synchronizing pulse (graph *c*), the plate current will be made to drop rather sharply with the result that the voltage across the feed-back coil will experience a reversal as at 24 (graph *b*). This reversal in the feed-back voltage will add to the negative pulse and further reduce or assist in the reduction of the plate current. This will result in a rapid shut-off of the oscillator plate current to zero level thus terminating the cycle (graph *a*). After the magnetic field of the deflection coil 10 has collapsed, the voltage across the feed-back coil becomes zero and due to the steady state bias conditions now prevailing the plate current begins to flow again. The resulting increase of the magnetic field, however, is again retarted by the resulting feed-back voltage as before. Thus, the cycle is repeated as already described. In graph *d*, the effective control grid voltage is shown indicating that the grid voltage is made up of the feed-back voltage due to the feed-back magnetic field and of the outside synchronous pulses.

It will be thus seen that the circuit described serves to retard any increase in the plate current, but accelerates the decrease of the plate current. This decrease in the plate current must be initiated by an outside source since otherwise a condition of equilibrium exists. This is a desirable feature as it is impossible for such a device to be out of step with the synchronizing signal. It should also be noted that the shape, and to a great extent, the size of the synchronizing signal has no effect on the operation of the sweep circuit. The rate of the plate current rise is primarily determined by the voltage generated across the feed-back coil and the mutual conductance of the tube. This rate may be conveniently varied by adjusting the screen potential as shown in Fig. 1. Instead of varying the frequency of the circuit this control varies the amplitude of the sweep voltage. In contrast to previously proposed systems where a frequency control was employed, the present amplitude control may be operated without danger to the cathode ray oscilloscope screen as has been the case heretofore.

While the above is a description of the principles of this invention in connection with specific apparatus, it is to be clearly understood that this description is made only by way of example and not as a limitation on the scope of this invention.

I claim:

1. A sawtooth wave generator comprising an electron tube having a cathode, two grids, and an anode, a load coil connected between said plate and one of said grids, a diode in series with a time constant circuit connected across said load coil, a feedback coil inductively coupled to said load coil, a full-wave rectifier energized by said feedback coil, means coupling said rectifier and coupled to the other of said grids to provide a negative direct current voltage whose amplitude varies in accordance with the amplitude of the current in said feedback coil, and a source of synchronizing potential coupled to said feedback coil whereby said generator oscillates only in the presence of said synchronizing potential.

2. A sawtooth wave generator as recited in claim 1 further comprising means for applying said synchronizing potential to said feedback coil at a point intermediate the ends thereof.

3. A field supply circuit comprising a sawtooth voltage generating tube including a plate, a screen and a control grid, a coil for producing a magnetic field bridged across said plate and said screen grid, an oscillation damping circuit including a diode rectifier across said field coil, a field pick-up coil substantially adjacent and inductively coupled to said first named coil, connections comprising an output circuit for said pick-up coil including a pair of rectifiers having one like pole of each connected together and coupled to said control grid and the other pole of each of said rectifiers of said pair connected to opposite ends of said pickup coil and a connection to ground from a given point in said pickup coil intermediate the ends thereof, means for applying controlling synchronizing pulses to said pick-up coil at said given point, and means for adjusting the bias on said screen grid to vary the amplitude of the sawtooth voltages.

LOUIS W. PARKER.

REFERENCES CITED

The following references are of record in the file of this patent:

UNITED STATES PATENTS

| Number | Name | Date |
|---|---|---|
| 2,074,495 | Vance | Mar. 23, 1937 |
| 2,193,850 | Andrieu et al. | Mar. 19, 1940 |
| 2,308,908 | Bahring | Jan. 19, 1943 |
| 2,320,551 | Bahring | June 1, 1943 |

FOREIGN PATENTS

| Number | Country | Date |
|---|---|---|
| 442,938 | Great Britain | Feb. 18, 1936 |